UNITED STATES PATENT OFFICE.

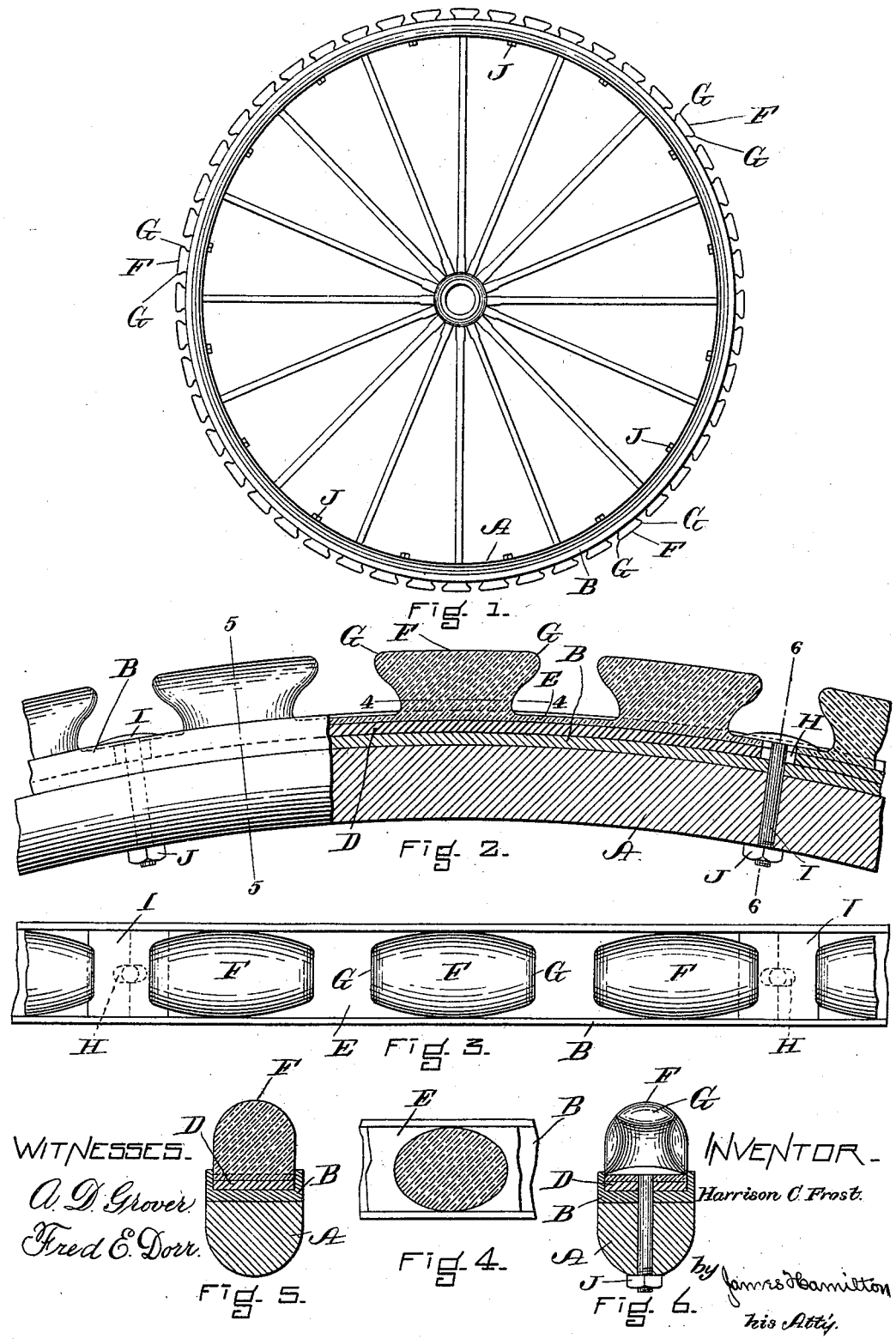

HARRISON C. FROST, OF BROOKLINE, MASSACHUSETTS.

TIRE FOR WHEELS.

SPECIFICATION forming part of Letters Patent No. 644,288, dated February 27, 1900.

Application filed March 1, 1899. Serial No. 707,282. (No model.)

*To all whom it may concern:*

Be it known that I, HARRISON C. FROST, a citizen of the United States, and a resident of Brookline, in the county of Norfolk and State of Massachusetts, have invented a new and useful Improvement in Tires for Wheels, of which the following is a specification, reference being had to the accompanying drawings, in which—
Figure 1 is an elevation of a wheel fitted with my new tire. Fig. 2 is a side elevation of a section of my new tire bolted in place in its tire-holder to the felly, part of the view being sectional. Fig. 3 is a top plan view of what is shown in Fig. 2. Fig. 4 is a sectional view on line 4 4, Fig. 2. Fig. 5 is a sectional view on line 5 5, Fig. 2. Fig. 6 is a sectional view on line 6 6, Fig. 2.

My invention relates to improvements in tires which are made up of sections that have a "separated" tread or a tread which is made up of a series of alternate elevations and depressions; and, further, my invention relates to improvements in tires which are solid, as distinguished from tires which are chambered to receive retaining-strips.

Tires have heretofore been secured to their wheels by means of retaining-strips which are passed longitudinally through the substance of the tire. These retaining-strips destroy the resiliency and greatly lessen the durability of the tire. Moreover, the chambers for these retaining-strips weaken the tire.

One object of my invention is to dispense with these retaining-strips and to provide a solid tire and one which is more resilient, more durable, and stronger.

Another object of my invention is to provide an efficient mode of securing the tire to the wheel and at the same time avoid the use of the objectionable method of passing the securing means through the active portion of the tread of the tire, thereby destroying its resiliency.
A further object of my invention is to increase the resiliency of the tire over that of known forms of tire having a separated tread, and the construction of the tread portion to accomplish this object is a feature of my invention. This construction also affords the advantages of economy in rubber and of the absence of any tendency on the part of the tire to pick up and throw stones, gravel, or other missiles.

Another object of my invention is to provide a tire which will allow the water of the roadway to flow off freely between the tread portions and which will not collect the water between the tread portions and cause it to be thrown out upon the occupants of the vehicle.

A further object of my invention is to provide a tire which may be readily fitted to different sizes of wheels without any sacrifice of uniformity of appearance in the completed tire.

My invention consists in the tire and the combinations hereinafter described and claimed.

In the drawings illustrating the principle of my invention and the best mode now known to me of applying that principle, A is the felly of the wheel, on the outer peripheral surface of which is secured the tire-holder B. My new tire is made up in sections which permit of the fitting of a tire of my construction to any size of wheel. The base of the tire is of hard rubber, which gives a degree of strength and firmness to the tire. Above this hard-rubber base D is a thin covering of soft rubber E. Integral with this soft-rubber covering E are the tread portions F, separated from each other by intervals, as shown. The tread portions F are undercut, as best shown in Fig. 2, and this undercut construction gives several advantages, among which are, first, the resiliency of the overhanging portion G is increased, thereby increasing the resiliency of the tire as a whole; second, the opening between the tread portions being narrower at the top than at the bottom a stone entering this opening will not be held by the tread portions or thrown against the occupants of the carriage, but will pass downward and outward, and, third, the undercutting gives economy in rubber. The lower part of the tread portion F is elliptical in horizontal cross-section, as is best shown in Fig. 4. This construction prevents the tire from collecting water between the tread portions and throwing it out on the occupants of the carriage. A free flow is afforded the water, and there is in this construction no tendency to collect the water from the surface of the road. The extremities of the sections which make up my tire are formed with slots H, which pass through the soft-rubber covering E and the hard-rubber base D. The sections are secured to the tire-holder and felly by a bolt I and nut J, the bolt I passing through the slots H and bolt-holes in the tire-holder B and felly A. The slots H are open-ended and slightly elongated. The sections are preferably made of uniform length, and should the wheel be of such a size that a whole number of sections would form too large a tire the total length of the tire may be reduced by cutting from the extremities of each section a short length, as one-sixteenth of an inch, making a total reduction of one-eighth of an inch in the total length of the section. My construction also admits of cutting from a section one or two tread portions F, preferably at a point midway between the tread portions. A slot is then formed in the extremity and the compensating portion inserted. In this way my construction permits of a tire of any size being made up and the uniform appearance of the tire is retained, for the tread portions are maintained of the uniform size and the intervals between them of the same uniform length. This method of securing the tire to the wheel is new with me. Where the bolt is passed through the solid tread portion a loss of resiliency is inevitable. The hole above the bolt-top must be filled by a rubber plug, and this plug soon wears loose and falls out. The holes thereby left gather stones and the tire soon becomes worthless. Again, in such a construction there is no cushioning effect on the bolt and the nut may be stripped from the threads, or if a screw is used the threads may be stripped from the screw or the screw loosened. In my new mode of securing the tire to the wheel I avoid these disadvantages by, first, passing the bolt, screw, or other receiving means through the tire between the portions which form the tread of the tire, and, second, by providing under the bolt or screw head a thin cushion of soft rubber. This cushion being thin and very resilient prevents by its cushioning effect any stripping of the nut. The advantages of my method of securing the tire to the wheel are obtained by, first, separating the tread portions from each other by intervals which are wide enough to permit the insertion of the bolt between them, and, second, by making the soft rubber which covers the hard-rubber base thin and resilient to form a cushion for the bolt. The simple and easy method of securing the tire to the wheel enables me to dispense with locking-bolts of special construction and with the gripping-machines and other special machinery. The only tools necessary to secure the tire to its wheel by my method are those found in any carriage-smith's shop.

The advantages of my tire are, first, freedom from retaining-strips, with increased resiliency, durability, and strength; second, no tendency to pick up or throw missiles; third, no tendency to collect and throw surface water; fourth, adjustability to any size of wheel without sacrifice of uniformity in appearance; fifth, a simple means of securing the tire to its wheel; sixth, a cushion provided for the bolt-head by part of the tire itself, and, seventh, my tire is solid and not chambered.

What I claim is—

1. An elastic tire for wheels, consisting of a base member of hard rubber or like material, an elastic member surmounting and attached to said base member, and tread members integral with said elastic member, joined thereto by neck portions, the tread portions flattened on their exterior, elongated and overhanging said neck portions at the ends, where they approach each other, leaving a recess underneath, whereby an elastic transfer from one tread to another without jolts is secured, substantially as specified.

2. As a new article of manufacture, a tire made up in sections, each section having a base formed of a lower portion of hard rubber or like material covered by a thin soft-rubber covering and, integral with said soft-rubber covering, separate tread portions.

3. As a new article of manufacture, a solid tire made up in sections, each section having a base formed of a lower portion of hard rubber or other like material, covered on top by a thin soft-rubber covering integral therewith; and integral with said soft-rubber covering, tread portions; each section being slotted at the extremities of its base to receive securing-bolts, said slots being formed in the hard-rubber lower portion and the thin soft-rubber covering therefor.

4. As a new article of manufacture, a solid tire made up in sections, each section having a base formed of a lower portion of hard rubber or other like material, covered on top by a thin soft-rubber covering integral therewith; and integral with said soft-rubber covering, tread portions; the base of said tread portions being rounded to permit the free flow of surface water from the open spaces between the said tread portions; and each section being slotted at the extremities of its base to receive securing-bolts, said slots being formed in the hard-rubber lower portion and the soft-rubber covering therefor.

5. The combination of a solid tire made up of a base comprising a lower portion of hard rubber or other like material, and a thin soft-rubber covering integral therewith; and tread portions integral with said soft-rubber covering and separated from one another by portions of said base; a wheel; and securing means such as bolts, screws, or the like which pass downwardly through said slots, the heads of said bolts or screws resting upon and being cushioned by said soft-rubber covering.

6. The combination of a solid tire made up of a base comprising a lower portion of hard rubber or other like material, and a thin soft-rubber covering integral therewith; and tread portions integral with said soft-rubber covering and separated from one another by portions of said base; a wheel; a tire-holder; and securing means such as bolts, screws, or the like which pass downwardly through said slots, the heads of said bolts or screws resting upon and being cushioned by said soft-rubber covering.

7. The combination of a solid tire made up in sections, each section having a base formed of a lower portion of hard rubber or other like material, covered on top by a thin soft-rubber covering integral therewith; and integral with said soft-rubber covering, tread portions separated from one another by portions of said base; a wheel; and securing means such as bolts, screws, or the like which pass downwardly through said slots, the heads of said bolts or screws resting upon and being cushioned by said soft-rubber covering.

8. The combination of a solid tire made up in sections, each section having a base formed of a lower portion of hard rubber or other like material, covered on top by a thin soft-rubber covering integral therewith; and integral with said soft-rubber covering, tread portions separated from one another by portions of said base; a wheel; a tire-holder; and securing means such as bolts, screws, or the like which pass downwardly through said slots, the heads of said bolts or screws resting upon and being cushioned by said soft-rubber covering.

9. The combination of a solid tire made up in sections, each section having a base formed of a lower portion of hard rubber or other like material, covered on top by a thin soft-rubber covering integral therewith; and integral with said soft-rubber covering, tread portions which are wider at the top than at the base and separated from one another by open spaces which are narrower at the top than at the bottom; and the extremities of the base of each section being slotted to receive securing-bolts; a wheel; and securing means such as bolts, screws, or the like which pass downwardly through said slots, the heads of said bolts or screws resting upon and being cushioned by said soft-rubber covering.

10. The combination of a solid tire made up in sections, each section having a base formed of a lower portion of hard rubber or other like material, covered on top by a thin soft-rubber covering integral therewith; and integral with said soft-rubber covering, tread portions which are wider at the top than at the base and separated from one another by open spaces which are narrower at the top than at the bottom; and the extremities of the base of each section being slotted to receive securing-bolts; a wheel; a tire-holder; and securing means such as bolts, screws, or the like which pass downwardly through said slots, the heads of said bolts or screws resting upon and being cushioned by said soft-rubber covering.

11. The combination of a tire made up of a lower portion of hard rubber or like material having integral therewith separate tread portions, and a thin cushion of soft rubber for cushioning the securing means; a wheel; and securing means, such as bolts, screws, or the like, which pass downwardly through holes in the hard-rubber lower portion in the interval between the bases of the soft-rubber tread portions and are cushioned by the said thin cushion of soft rubber.

12. The combination of a tire made up of a lower portion of hard rubber or like material having integral therewith separate tread portions, and a thin cushion of soft rubber for cushioning the securing means; a wheel; a tire-holder; and securing means, such as bolts, screws, or the like, which pass downwardly through holes in the hard-rubber lower portion in the interval between the bases of the soft-rubber tread portions and are cushioned by the said thin cushion of soft rubber.

In testimony whereof I have affixed my signature in presence of two witnesses.

HARRISON C. FROST.

Witnesses:
 JAMES HAMILTON,
 E. A. ALLEN.